US006451385B1

(12) United States Patent
Hilden et al.

(10) Patent No.: US 6,451,385 B1
(45) Date of Patent: Sep. 17, 2002

(54) PRESSURE INFILTRATION FOR PRODUCTION OF COMPOSITES

(75) Inventors: Jon L. Hilden, Lafayette; Kevin P. Trumble; Frank R. Cichocki, Jr., both of West Lafayette, all of IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 09/564,318

(22) Filed: May 3, 2000

Related U.S. Application Data

(60) Provisional application No. 60/132,387, filed on May 4, 1999.

(51) Int. Cl.[7] .............................. B05D 1/18; B05D 3/00; B05D 1/36
(52) U.S. Cl. ................. 427/431; 427/443.2; 427/398.1; 427/404; 427/314; 427/294; 427/350
(58) Field of Search .............................. 427/431, 443.2, 427/398.1, 404, 350, 314, 294

(56) References Cited

U.S. PATENT DOCUMENTS

| | | | |
|---|---|---|---|
| 3,547,180 A | * 12/1970 | Cochran et al. | ............... 164/61 |
| 3,608,170 A | 9/1971 | Larson et al. | ........ 29/149.5 PM |
| 3,718,441 A | * 2/1973 | Landingham | .............. 29/182.1 |
| 3,864,154 A | 2/1975 | Gazza et al. | .............. 29/123 B |
| 3,929,424 A | 12/1975 | Krock et al. | ................ 29/182.1 |
| 4,617,053 A | 10/1986 | Joó et al. | ........................ 75/244 |
| 4,718,941 A | 1/1988 | Halverson et al. | ............. 75/236 |
| 4,769,071 A | 9/1988 | Klar et al. | ..................... 75/246 |
| 4,828,008 A | * 5/1989 | White et al. | ............... 164/66.1 |
| 5,132,081 A | 7/1992 | Lee | ................................ 419/9 |
| 5,269,989 A | 12/1993 | Pyzik | .......................... 264/60 |
| 5,298,283 A | * 3/1994 | Rocazella et al. | .......... 427/181 |
| 5,676,907 A | * 10/1997 | Ritland et al. | .............. 264/643 |

FOREIGN PATENT DOCUMENTS

EP        115742 A    *  8/1984

OTHER PUBLICATIONS

E. J. Gonzalez and K. P. Trumble, "Spontaneous Infiltration of Alumina by Copper–Oxygen Alloys," J. Am. Ceram. Soc., 79 [1] 114–120 (1996).
M. K. Aghajanian, M. A. Rocazella, J. T. Burke, and S D. Keck, "The Fabrication of Metal Matrix Composites by Pressureless Infiltration Technique," J. Mater. Sci., 26, 447–454 (1991).
C. Toy and W. D. Scott, "Ceramic–Metal Composite Produced by Melt Infiltration," J. Am. Ceram. Soc., 73, 97–101 (1990).

(List continued on next page.)

Primary Examiner—Michael Barr
(74) Attorney, Agent, or Firm—Woodward, Emhardt, Naughton, Moriarty & McNett

(57) ABSTRACT

A process is disclosed for infiltrating a liquid composition, such as a molten metal or thermoplastic or thermosetting polymer, into a porous solid material, such as a ceramic or porous metal, by contacting the porous material with the liquid composition at a first pressure and then increasing the pressure by at least the critical capillary pressure for the liquid composition/porous solid material system to effect infiltration. The infiltrated liquid composition may then be solidified inside the porous material, such as by cooling, to produce composite materials including ceramic-metal composites as well as ceramic-polymer, metal-polymer, and metal—metal composites.

24 Claims, 6 Drawing Sheets

OTHER PUBLICATIONS

J. C. Rawers, W. R. Wrzesinski, "Melt Infiltration of Selected Intermetallics into SiC," Journal of Materials Science Letters 9 (1990) 503–505.

A. J. Cook and P. S. Werner, "Pressure Infiltration Casting of Metal Matrix Composites," Materials Science and Engineering, A144 (1991) 189–206.

E. Carreño–Morelli, T. Cutard, R. Schaller, C. Bonjour, "Processing and Characterization of Aluminium–Based MMCs Produced by Gas Pressure Infiltration," Materials Science and Engineering A251 (1998) 48–57.

W.R. Purcell, Shell Oil Co., "Interpretation of Capillary Pressure Data", Petroleum Transactions, AIME, 1950, pp. 369–371, vol. 189, Houston, Texas, U.S.A.

Geoffrey Mason and Norman Morrow, "Meniscus Displacement Curvatures of a Perfectly Wetting Liquid in Capillary Pore Throats Formed by Spheres", *Journal of Colloid and Interface Science*, Jan. 1986 by Academic Press, Inc., pp. 46–56, vol. 109, No. 1., Socorrow, New Mexico.

Nahum A. Travitzky & Nils Claussen, "Microstructure and Properties of Metal Infiltration RBSN Composites", *Journal of the European Ceramic Society*, 1992 Elsevier Science Publishers Ltd., 1992, pp. 61–65, England.

Geoffrey Mason & Norman R. Morrow, "Effect of Contact Angle on Capillary Displacement Curvatures in Pore Throats Formed by Spheres", *Journal of Colloid and Interface Science*, Jan. 1994 by Academic Press, Inc., pp. 130–141, vol. 168, Laramie Wyoming.

Raymond P. Mayer & Robert A. Stowe, "Mercury Porosimetry—Breakthrough Pressure for Penetration Between Packed Spheres", *Journal of Colloid Science*, Mar. 1965, pp. 893–911, vol. 20, Ludington, Michigan.

S. Ban, E. Wolfram & S. Rohrsetzer, "The Condition of Starting of Liquid Imbibition in Powders", *Colloids and Surfaces*, 1987 Elsevier Science Publishers B. V., pp. 301–309, vol. 22, The Netherlands.

W.A. Kaysser and G. Petzow, "Geometry Models for the Elimination of Pores during Liquid Phase Sintering in systems with incomplete wetting", *Science of Sintering*, Sep. 1984, pp. 167–175.

K. P. Trumble, "Spontaneous Infiltration of Non–Cylindrical Porosity: Close–Packed Spheres", *Acta mater*, 1998, pp. 2363–2367, vol. 46, No. 7, Great Britain.

* cited by examiner

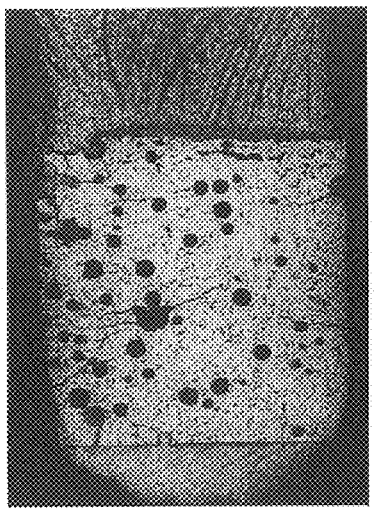 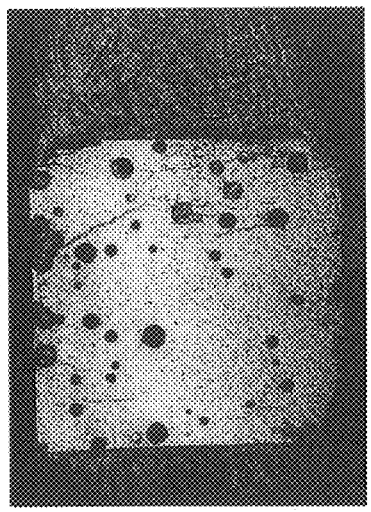 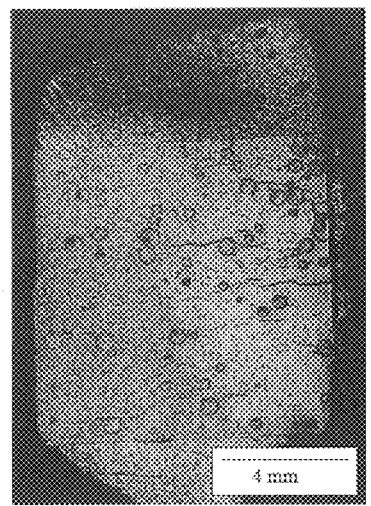
*Fig. 2a*  *Fig. 2b*  *Fig. 2c*

PRESSURE INFILTRATION FOR PRODUCTION OF COMPOSITES

This application claims priority to U.S. provisional application Ser. No. 60/132,387, filed May 4, 1999.

This invention was made with Government support under grant number 9402533-EEC, awarded by the National Science Foundation. The Government has certain rights in the invention.

FIELD OF THE INVENTION

The present invention relates to composites of porous materials infiltrated with a second composition and to processes for their manufacture. More particularly the invention relates to processes to fully infiltrate porous ceramic materials with partially wetting compositions and the composites made thereby. In particular, the invention relates to fully infiltrated ceramic-metal composites and their method of manufacture.

BACKGROUND OF THE INVENTION

Great strides in the development of ceramic-metal composite materials have been made over the past three decades. Ceramic-metal composites including metal-reinforced ceramic matrix composites (CMC), also known as cermets, and ceramic-reinforced metal matrix composites (MMC) blend the properties of hardness, rigidity, heat resistance and chemical resistance associated with ceramics, with properties such as electrical conductivity, mechanical strength, toughness and thermal shock resistance associated with metals. Such composites are useful in the manufacture of electrodes for molten electrolyte systems, components for internal combustion, jet and rocket engines, valves, armaments, armor and equipment for cutting, drilling, grinding and crushing. A preferred method of producing ceramic-metal composites is to infiltrate a porous ceramic particulate or fiber pre-form with a metal. Ceramic preforms may be easily machined into desired shapes prior to metal infiltration and densification by infiltration occurs with little or no shrinkage. Infiltration processes also tend to have the added advantage of reduced cycle times compared to other methods of ceramic-metal composite production.

One of the present difficulties in ceramic-metal composite production is the incomplete infiltration of the molten metal into the porous infrastructure of the ceramic material. This is particularly true for infiltration into spaces larger than the close-packed inter-particle spaces, such as unintentional packing defects or intentionally designed pores intended to provide large metal phases imbedded in the ceramic material. Typically, liquid metals do not wet ceramics well enough for spontaneous infiltration to occur. Even when the contact angle, $\theta$, for a given combination of molten metal and ceramic is less than 90 degrees, making the system partially wetting, the liquid will still not necessarily spontaneously infiltrate due to non-cylindrical pore shapes. For example, the threshold contact angle for spontaneous infiltration of close-packed spheres is 50.7 degrees. Furthermore, even when the contact angle is low enough to enable spontaneous infiltration into the close-packed structure, large pores that are several times the size of the pores between the packed particles are not filled, again due to non-cylindrical pore shape effects.

The prior art describes two subclasses of infiltration processes known as "forced" or "pressure" infiltration (PI), and spontaneous infiltration (SI). Ceramic-metal combinations, which are non-wetting, must use PI to affect infiltration. Such non-wetting systems are characterized by a contact angle, $\theta$, larger than 90° for a liquid metal drop resting on a flat ceramic substrate surface. In such systems, the replacement of solid-vapor surface area with solid-liquid surface area (i.e., infiltration) increases the surface free energy of the system and so requires the positive pressures of PI to force molten metal into the pores of the ceramic material against a positive capillary pressure and to prevent the metal from wicking back to the surface before the metal solidifies. PI processes typically require pressures in the range of 0.5 MPa to 170 MPa (1 MPa is 1 mega-pascal= 9.869 atmospheres=7500.6 Torr); however, the lower pressures tend to lead to incomplete pore filling even in uncommonly large pores between ceramic fibers packed to only 24% density. The higher pressures are required to obtain more complete infiltration of common industrial ceramics. Such high pressures can damage the ceramic preforms and require costly production equipment such as mechanical (hydraulic) presses with heated dies and high pressure vessels able to exert the pressure by gas.

Ceramic-metal systems that are "wetting" are thought to be suitable for SI. Wetting systems are characterized by contact angles, $\theta$, of less than 90°, though typically spontaneous infiltration only occurs with much lower contact angles, say below about 60°, due to its dependency on pore geometry. In such systems, the replacement of solid-vapor surface area with solid-liquid surface area (i.e., infiltration) decreases the surface free energy of the system. Molten metal thus imbibes spontaneously, provided there are no energy barriers preventing the attainment of the lower energy state.

Real systems, however, are characterized by irregular local pore geometries, which may present energy barriers preventing or limiting the extent of infiltration. Thus, even with wetting systems, PI is often necessary to achieve more complete infiltration. A number of methods have been developed to enhance wetting and infiltration of metal(s) into ceramic materials. These include the addition of wetting agents or reacting either the metal or ceramic prior to infiltration to facilitate wetting. See, for example, U.S. Pat. No. 3,864,154 to Gazza et al., describing the addition of silicon to aluminum as a wetting agent to infiltrate a silicon boride or aluminum boride or boron ceramic; U.S. Pat. No. 3,718,441 to Landingham, in which the metal is heated at low pressure to remove an oxide film to facilitate wetting; U.S. Pat. No. 4,617,053 to Joo et al. which teaches the chemical modification of the pore surfaces of a boron carbide ceramic to facilitate the wetting of reactive metals such as aluminum and aluminum alloys. These methods for facilitating SI are based on the concept of reducing the contact angle between the molten metal and ceramic surface. These methods still do not solve the problem of infiltrating large pores and defects within the ceramic material.

Vacuum infiltration methods have also been developed to minimize voids in ceramic-metal composites. The goal of these methods has been to prevent the entrapment of gas within the ceramic material that would prevent complete infiltration. See, for example, Toy and Scott, Ceramic-Metal Composite Produced by Melt Infiltration, Journal of American Ceram. Soc., 73 (1) 97–101 (1990). Under these techniques, a ceramic material is embedded in or surrounded by the infiltrant metal and placed in a furnace. The furnace is then evacuated to a set pressure, heated to melt the metal, which leads to infiltration, and then cooled to solidify the metal while maintaining the vacuum pressure. Though these vacuum techniques tend to improve infiltration, capillary effects still prevent spontaneous infiltration of larger pores and defects within the ceramic, resulting in voids within the ceramic-metal composite.

There remains a need for general techniques to improve infiltration of metal compositions into porous ceramics under simplified conditions that do not require expensive and bulky high-pressure equipment. In addition, there remains a need for improved processes of producing ceramic-metal composites without the use of high pressures that would damage fine pre-form structures.

SUMMARY OF THE INVENTION

It is an object of this invention to provide processes for producing composites from wetting systems without the need for high-pressure furnaces. It is further an object of this invention to provide processes of composite production that reliably provide complete infiltration of liquid phase material into porous solids including infiltration of large pores and defects in the porous substrate. Another object of the present invention is to provide processes to fully infiltrate ceramic materials with molten metal compositions to produce ceramic-metal composites. A further object of the invention is to provide a generalized process for determining optimum process conditions for the complete infiltration of any given porous ceramic material by any given metal composition.

Further objects, embodiments and features of the present invention will be apparent from the following description and the accompanying figures and table.

BRIEF DESCRIPTION OF THE DRAWINGS

FIG. 2 shows micrographs of sections through preforms of pressed $ZrB_2$ powder formed to contain 100–500 $\mu$m diameter pores that have been spontaneously infiltrated with Cu—B (a) under 1 atm flowing argon-5% hydrogen; (b) under vacuum (approx. 1 Torr); and (c) heating under vacuum followed by application of 1 atm argon-5% hydrogen before cooling.

DESCRIPTION OF THE PREFERRED EMBODIMENTS

Figure 1:
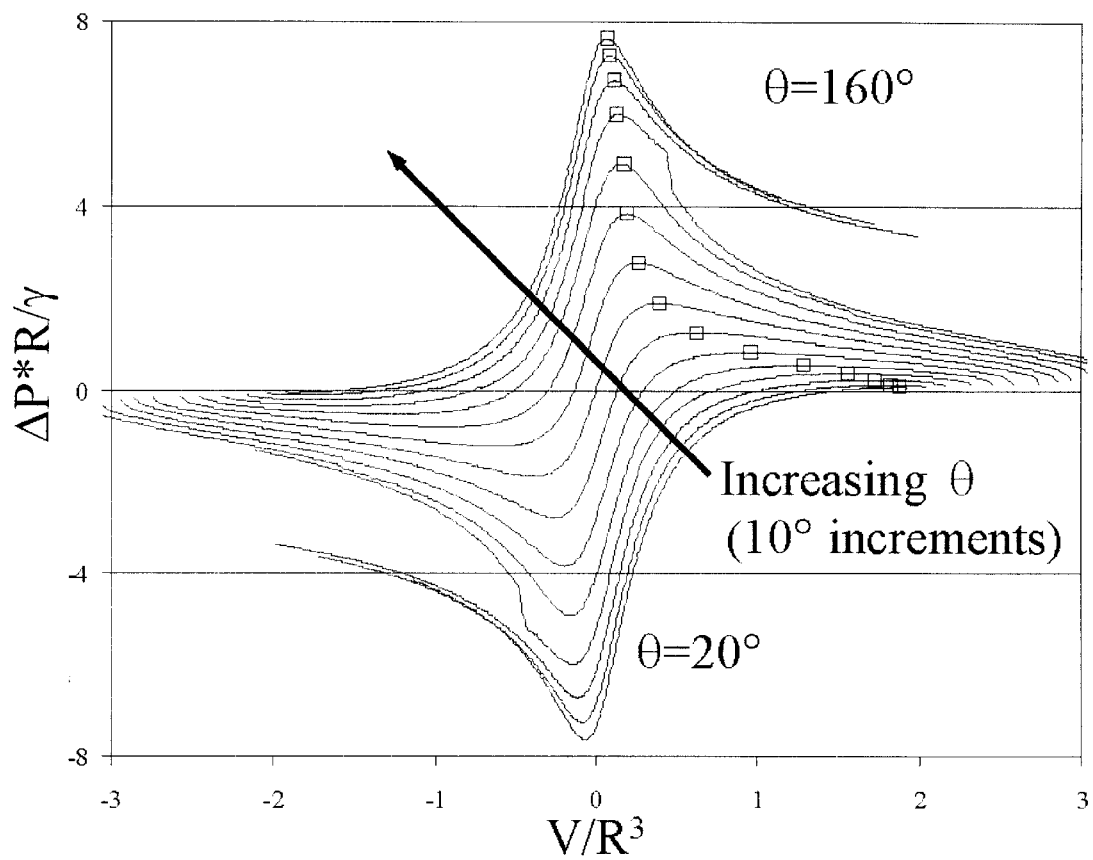
FIG. 1 is a graph of $\Delta P^*R/\gamma$ vs. $V/R^3$ as a function of $\theta$ from which the critical pressure differentials for infiltration are determined.

One preferred embodiment of the process of the present invention produces ceramic-metal composites characterized by complete infiltration of the metal into the porous interior of the ceramic without the use of high pressures. (As used herein, "complete infiltration" is intended to mean that large pores and defects are infiltrated with metal as well as the close-packed inter-particle spaces. It is understood that there is always the possibility that a small amount of porosity may persist for a variety of reasons. This possibility is included in the spirit of "complete infiltration.") The process is particularly suitable for partially wetting systems, which are defined as ceramic-metal composition combinations having surface contact angles, $\theta$, of less than or equal to 90 degrees for a molten metal drop resting on the surface of the ceramic.

The present invention provides for a simplified process for obtaining complete infiltration of a ceramic material including large pores and defects without resort to high pressures. In a simplified embodiment, the ceramic substrate and metal composition are placed together in a furnace which is evacuated to a first pressure either before, during, or after heating the furnace to at least the melting temperature of the metal composition. The first pressure is maintained for a period of time sufficient for the metal to become molten and then while the metal composition is molten, the pressure of the furnace is increased to a second pressure to drive complete infiltration. The required increase in pressure is equal to or greater than $\Delta P_{crit}$ which is the maximum capillary pressure of the real system. The second pressure is then maintained as the components are cooled to solidify the metal composition within the ceramic material, resulting in a ceramic-metal composite characterized by complete infiltration.

In that it is the differential between the pressure in the void volume of the ceramic and the external pressure on the molten metal that must equal or exceed $\Delta P_{crit}$, it is preferred to establish the ceramic material at the first pressure in a manner that avoids sealing off the ceramic void volume from the chamber atmosphere through contact of the molten composition with the surface of the porous ceramic material prior to the establishment of the first pressure. This can be done by establishing the first pressure prior to or during heating, while the metal is still solid. Alternatively, the first pressure can be established after heating, but prior to significant melting of the metal, or prior to contacting or immersing the ceramic material with the molten metal.

It is likewise preferred to have the ceramic material immersed in molten metal immediately prior to and during the pressure change to avoid the infusion of the pressurizing furnace gas into the ceramic pores ahead of the molten metal, which event would decrease the effective capillary pressure.

In a preferred embodiment, the pressure differential between the first pressure and second pressure is greater than the critical capillary pressure which is calculated by an algorithm that relates the contact angle, $\theta$, for the particular combination of ceramic and metal composition, the ceramic particle size, R, and the liquid-vapor surface tension, $\gamma$. The algorithm calculates a critical capillary pressure, $\Delta P_{crit}$, which is the minimum difference between the liquid phase pressure and vapor phase pressure in the ceramic material that will result in complete infiltration. Applied pressure differentials greater than this critical capillary pressure will achieve the same results, potentially at a faster rate, but without other significant advantage beyond possible convenience for the operator.

The key to achieving complete infiltration is the change between the first pressure and second pressure and not the absolute pressures themselves. The upper limitation of the first pressure is dictated by entrapment of gases in the ceramic material which may then cause bubbles in the infiltration, as well as equipment cost and convenience considerations. The lower limits for the first pressure are dictated by vacuum equipment limitations as well as the vapor pressure of any wetting agents or other components added to the system; the first pressure should not be so low as to boil or significantly vacuum off such components. As a matter of convenience and to avoid gas entrapment, preferred first pressures are at sufficient vacuum to allow the second pressure to be at or close to atmospheric pressure. The desirability of the second pressure being at or close to atmospheric pressure is not due to any limitation on the effectiveness of infiltration or selection of $\Delta P_{crit}$, but rather only for convenience and to simplify equipment requirements and reduce cycle times. This is particularly true given the significant additional equipment requirements necessary to safely operate high temperature furnaces at high pressures.

For many ceramic-metal combinations of present industrial interest, typical initial vacuum pressures range from below about $10^{-3}$ Torr to about 400 Torr, preferably between about $10^{-3}$ Torr and about 100 Torr, yet more preferably between about $10^{-3}$ Torr and about 10 Torr. Typical second pressures range from about 380 Torr to about 760 Torr. Second infiltration pressures greater than about 760 Torr (1 ATM) are also completely suitable for the present invention, but may require significant differences in furnace configuration to support pressurized heating as compared to merely vacuum furnace equipment.

The prior art difficulties with infiltration of larger pores and defects in the ceramic substrate have been rooted in the prior art models of capillary action in porous bodies used to analyze process conditions. Prior art models have been based either on the hydraulic radius of the pores in the ceramic material or on assumed pore shapes of extruded geometric shapes such as cylindrical and rectangular tubes. These models do not account for sophisticated capillary phenomena associated with the irregularities of local pore geometry in real ceramics. These models predict complete spontaneous infiltration for contact angles of less than or equal to 90° and a need for positive pressure to force infiltration for systems with contact angles greater than 90°.

A new model using numerical analysis has been developed to more accurately model the capillary pressures generated in real ceramics, particularly those having large or irregularly shaped pores. Details of the model are described in Jon Hilden, "Low Pressure Infiltration", Master of Science Thesis, Purdue University, December 1998, incorporated herein by reference. The model generates a plot of $\Delta P*R/\gamma$ vs. $V/R^3$ for a given contact angle, $\theta$, wherein $\theta$ is the contact angle for a drop of liquid resting on a solid surface, $\Delta P$ is the capillary pressure which is the pressure differential between the liquid and vapor phases in the pores, R is the average particle radius, V is the volume of infiltration of liquid into the pores between the particles, $\gamma$ is the surface tension between the liquid and the vapor phase, and $\Delta P*R/\gamma$ is the normalized capillary pressure. See FIG. 1.

Referring now to FIG. 1, for $\theta$ greater than 90°, the work of infiltration (i.e. the integrated area under the curve) is positive, indicative of an increase in surface free energy for the infiltrated state, resulting in a thermodynamically less stable state, thus requiring positive pressures to achieve and maintain the state during solidification. For $\theta$ less than 90°, the work of infiltration is negative, indicative of a decrease in surface free energy for the infiltrated state, resulting in a thermodynamically more stable state. However, there is a maximum in the function existing on the positive side of the normalized capillary pressure axis (i.e. $\Delta P*R/\gamma>0$), indicative of an energy barrier that must be overcome to reach the thermodynamically preferred infiltrated state, thus predicting a necessary positive pressure on the system to drive a complete infiltration.

The new model is a general model for fluid infiltration of porous materials and the plot of $\Delta P*R/\gamma$ vs. $V/R^3$, and thus the maxima of the function for any given $\theta$, is independent of the materials. The critical capillary pressure, $\Delta P_{crit}$, which is the capillary pressure at the maximum of the function for a given $\theta$, and thus the required minimum applied pressure differential for any combination of ceramic and metal composition can thus be calculated with a knowledge of $\theta$, $\gamma$, and R. Methods for measuring $\theta$ are well known in the art, including the Sessle drop experiment as described in A. W. Adamson, *Physical Chemistry of Surfaces*, 5$^{th}$ Ed., John Wiley & Sons, Inc., 1990 p. 389. Likewise, $\gamma$, is readily measured by well known methods, as for example, the maximum bubble pressure method or the ring method, described in A. W. Adamson, *Physical Chemistry of Surfaces*, 5$^{th}$ Ed., John Wiley & Sons, Inc., 1990 pp. 18 and 23. The ceramic particle radius is a basic parameter for any ceramic and is readily obtained or measured by known methods.

Figure 5:
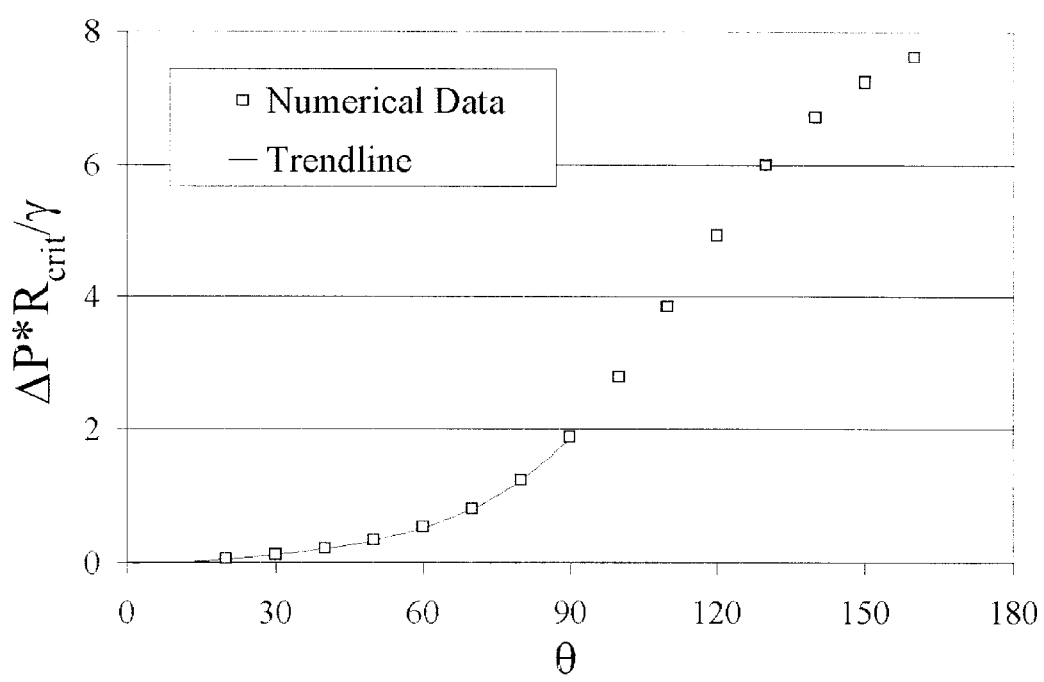
FIG. 5 is a graph of the maxima for $\Delta P^*R/\gamma$ as a function of $\theta$ for the data plotted in FIG. 1, with a fitted curve for $\theta=20°$ to $90°$. The figure includes the equation for the fitted curve transformed to provide $\Delta P_{crit}$ as a function of $\theta$, R and $\gamma$ for any given wetting system.

Table 1 contains normalized critical capillary pressures as a function of $\theta$ as calculated from the plot in FIG. 1. Likewise, FIG. 5 shows a plot of the maxima of $\Delta P*R/\gamma$ as a function of $\theta$, ($\Delta P_{crit}*R/\gamma$ vs. $\theta$), to which a curve can be fitted for $\theta$=20–90 degrees. Transforming the equation for the fitted curve to give $\Delta P_{crit}$ as a function of $\theta$, $\gamma$ and R yields the equation:

$$\Delta P_{crit} = \frac{\gamma}{R}[-1.543*(\cos(\theta))^3 + 3.932(\cos(\theta))^2 - 4.268(\cos(\theta)) + 1.876]$$

Thus an operator need only calculate the critical capillary pressure, $\Delta P_{crit}$, from the measured parameters for the desired system, $\theta$, $\gamma$ and R, and the information in Table 1 or by calculation from the above equation, to set the process conditions necessary for complete infiltration of the ceramic with the metal composition, i.e. set the first and second pressures so as to differ by at least the critical capillary pressure, $\Delta P_{crit}$.

TABLE 1

| Normalized critical capillary pressures as a function of contact angle, $\theta$. | |
|---|---|
| $\theta$ [degrees] | $\Delta P*R/\gamma$ |
| 160 | 7.6 |
| 150 | 7.2 |
| 140 | 6.7 |
| 130 | 6.0 |
| 120 | 4.9 |
| 110 | 3.8 |
| 100 | 2.8 |
| 90 | 1.9 |
| 80 | 1.2 |
| 70 | 0.82 |
| 60 | 0.54 |
| 50 | 0.35 |
| 40 | 0.22 |
| 30 | 0.12 |
| 20 | 0.063 |

It would be readily apparent to one skilled in the art to utilize the same technique to infiltrate ceramic or other porous materials with other fluids of interest. Examples of such extended uses would include but are not limited to infiltration of a thermosetting or thermoplastic polymer solution into a porous ceramic or metal to produce polymer infused ceramic or metal composites, or infiltration of a metal composition into a porous second metal composition having a higher melting temperature.

As with metal infusion into ceramics described above, the porous material would be contacted with polymer solution at a first pressure, preferably a pressure less than atmospheric pressure, followed by an increase of the pressure by at least the critical capillary pressure as calculated above for ceramic-metal systems, to induce complete infiltration of the porous material with the polymer solution prior to setting of the polymer. Unlike metallic infiltrants, the viscosity of many polymer solutions may be an issue from a kinetic standpoint. Many polymers are too viscous to allow spontaneous infiltration in a reasonable timeframe. Such systems require high pressures to drive the kinetics of infiltration and so are not amenable to the low pressure infiltration methods of the present invention for kinetic reasons.

The processes of the present invention are generally applicable to all known porous ceramics. In that the process does not depend on the chemical composition of the ceramic, the process parameters for effective infiltration are determined based on the ceramic particle size and surface tension between the molten metal of choice and the given ceramic. The process is equally effective for the infiltration of metals into ceramics with particle sizes of less than 1 $\mu$m up to 1 mm. The process of the present invention is particularly suitable for ceramic particle sizes of 2–10 $\mu$m. Ceramics particularly suitable to the processes of the present invention include, but are not limited to, $ZrB_2$, $TiB_2$, $TiO_2$, TiC, NbC, AlN, SiC, $Si_3N_4$, $SiO_2$, MgO, $MgAl_2O_4$, $Al_2O_3$, and $ZrO_2$, BN, $B_4C$, WC, $MoSi_2$ and $UO_2$. For any ceramic selected for use in the present invention, the average particle size and the contact angle. for the ceramic with the selected metal composition, must be determined. Ceramics useful in the present invention may be in the form of loose ceramic powders or whiskers, compressed pellets of ceramic powder (particulate, whiskers, or fibers), or sintered ceramic forms. Compressed or sintered ceramic preforms may be machined or otherwise shaped prior to infiltration by the process of the present invention. Likewise, the finished composite may be subsequently machined to desired forms.

The present invention is applicable to a wide range of metal compositions including pure metals and alloys, provided the contact angle between the selected metal composition and selected ceramic is less than or equal to 90 degrees. Metals and alloys useful in the present invention include, but are not limited to, Cu and Cu alloys including Cu—B, Cu—O, bronze and brass; Al and Al alloys including Al—Cu, Al—Zn, Al—Si and Al—Mg; Ti and Ti alloys including Ti—V—Al; Co and Co alloys including HS21, SM302; Fe and Fe alloys including steels, such as 1020 and 4340 steel, stainless steels such as 304, 316, 440, 405 and 17-4PH stainless steel, and tool steels including W4, W2, M1 and T15 steel; Ni and Ni alloys including Inconel 700, Nimonic 80, Rene 40, Waspalloy and IN 700; and Zr and Zr alloys. Additional components may be added to the metal composition as desired to affect the final qualities of the composite material or to adjust the contact angle, $\theta$, provided they do not increase the contact angle for the system as a whole to greater than 90 degrees.

In a preferred embodiment, the infiltration process of the present invention is accomplished by placing a ceramic material together with a metal composition in a suitable vessel in a furnace such that when the metal composition becomes molten, it substantially immerses the ceramic material. This prevents the back-filling of the pores of the ceramic material with the repressurizing furnace gas, thus increasing the vapor pressure in the pores and decreasing the pressure differential between the liquid phase and the vapor phase in the pores. If this pressure differential, the capillary pressure, falls below the critical capillary pressure, complete infiltration may not be obtained.

Any typical configuration of the ceramic and metal composition within the furnace for purposes of infiltration that is known in the art is suitable in the present invention. For example, but not by limitation, the ceramic may be embedded in metal powder or pellets in a crucible. Alternatively, metal in the form of blocks, shreds, pellets or powder may be placed adjacent to, on top of, or under the ceramic so that when the metal melts, it flows over or otherwise immerses the ceramic. Other means to arrange the ceramic and metal composition components of the system are well known in the art and are suitable for use in the present invention.

The process of the present invention may be used in conjunction with other methods known in the art designed to affect the contact angle, $\theta$, but is not dependent on these additional measures. Such additional techniques include, but are not limited to, the addition of wetting agents such as silicon, boron, oxygen, sulfur, carbon, titanium, zirconium, magnesium or lithium, or chemical modification of the metal or ceramic surface, as for example, but not limited to, the removal of an oxide film, use of a flux, or coating the ceramic pore surfaces with a more wettable solid such as another metal. Additionally, mechanical means for reducing the effective contact angle are compatible with the present invention, as for example, but without limitation, the application of ultrasound as discussed by Y. Tsunekawa, H. Nakanishi, M. Okumiya and N. Mohri, "Ultrasonic Infiltration in Alumina fiber/Molten Aluminum System", Mater. Trans. JIM, 34 [1] 62–68 (1993). The use of any of these techniques may render an otherwise unsuitable ceramic-metal combination ($\theta > 90°$) useful in the present invention if the technique reduces the contact angle of the system as a whole to $\leq 90°$. The critical pressure differential is then calculated for the effective contact angle of the system as a whole.

While the invention has been described in detail in the foregoing description, the same is to be considered as illustrative and not restrictive in character, it being understood that only the preferred embodiments have been shown and described. The invention will now be further described with reference to the following specific Examples. It will be understood that these Examples are also only illustrative and are intended only to provide further understanding of the methods and processes of the present invention.

EXAMPLE 1

Infiltration of Cu—B into $ZrB_2$ Particulate Ceramic Containing Intentional Large Pores $ZrB_2$ ceramic preforms were made by mixing $ZrB_2$ powder with 100–500 $\mu$m polystyrene spheres, pressing the mix, and then pyrolyzing the polystyrene spheres at 600° C. The preforms were embedded in Cu—B shot in graphite crucibles.

In accordance with the prior art approach, one pre-form was then heated at a rate of 20° C./min to 1250° C. under 1 atm argon-5% hydrogen. The temperature was maintained at 1250° C. for 30 minutes and then cooled at a rate of 10° C./min to solidify the infiltrant. FIG. 2(a) shows a section through the resulting composite demonstrating infiltration of Cu—B throughout the pre-form except for the large pores.

In accordance with a second prior art approach, a second pre-form was subjected to a vacuum pressure of 1 Torr and then heated under vacuum at a rate of 20° C./min to 1250° C. The temperature was maintained at 1250° C. for 30 minutes and then cooled at a rate of 10° C./min to solidify the infiltrant, all under vacuum. FIG. 2(b) shows a section through the resulting composite demonstrating incomplete infiltration of the large pores.

In accordance with the process of the present invention, a third pre-form was subjected to a vacuum pressure of 1 Torr and then heated under vacuum at a rate of 20° C./min to 1250° C. The furnace was then pressurized with argon-5% hydrogen at 1 atm. Heating was continued at 1250° C. for 30 min before cooling at the rate of 10° C./min to solidify the infiltrant, both under 1 atm argon-5% hydrogen. FIG. 2(c) shows a section through the composite demonstrating complete infiltration of the pre-form including the large pores.

EXAMPLE 2

Infiltration of Cu—B into Sintered $ZrB_2$ Ceramic $ZrB_2$ sintered ceramic preforms were made by pressing 2–10 $\mu$m ceramic powder particles into cylindrical pellets and sintering in Argon atmosphere at 1800° C. in a graphite element furnace to 60% of theoretical density. The preforms were placed in contact with Cu—B shot in AlN crucibles.

Figure 3A:
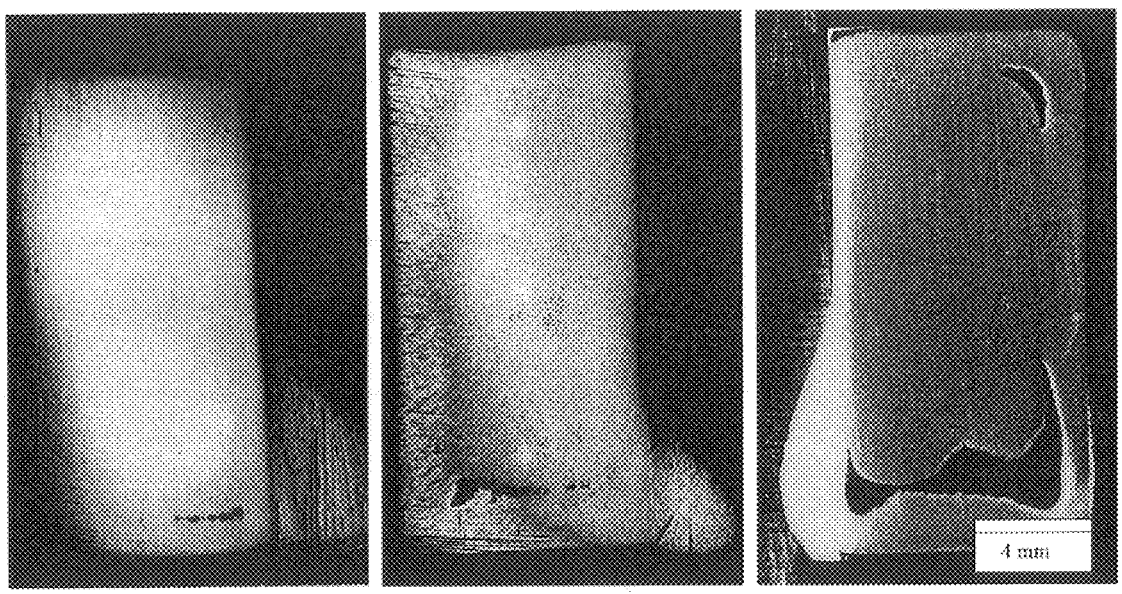
FIG. 3 shows micrographs of sections through preforms of sintered $ZrB_2$ that have been spontaneously infiltrated with Cu—B (a) under 1 atm flowing argon-5% hydrogen; and (b) by heating under vacuum (approx. 1 Torr) followed by application of 1 atm argon-5% hydrogen before cooling.

Three preforms were treated according to the prior art approach by firing the assemblages at 1300° C. under 1 atm argon-5% hydrogen for 30 minutes. FIG. 3(a) shows a section through the resulting composites demonstrating incomplete infiltration of the Cu—B alloy into the sintered pellets.

Figure 3B:
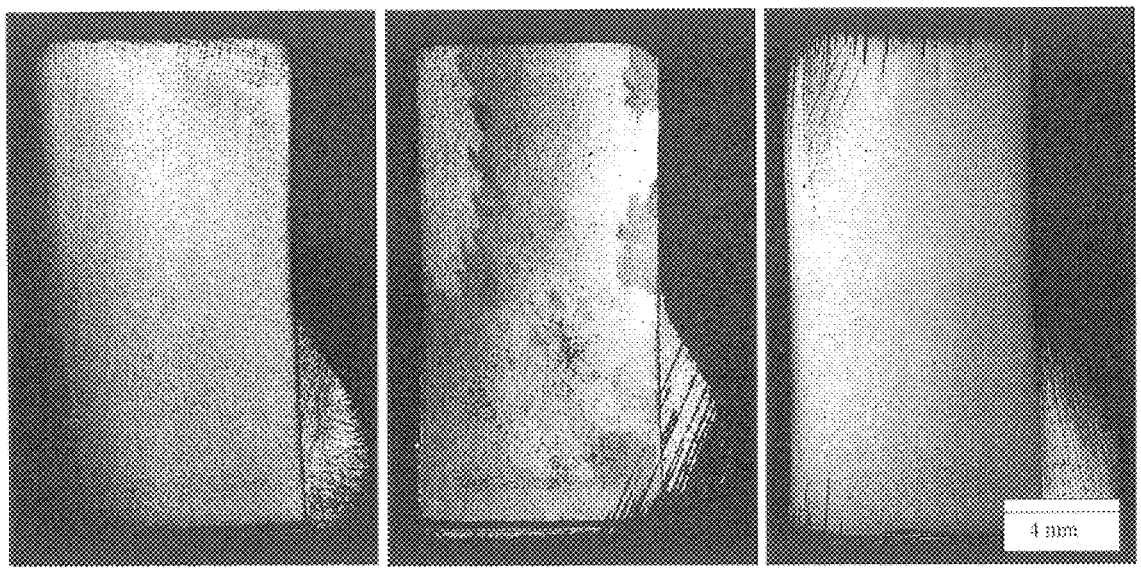

Three other preforms were treated in accordance with the process of the present invention by heating the assemblages to 1300° C. under vacuum (1 Torr) followed by application of argon-5% hydrogen at 1 atm for 30 min while maintaining the temperature at 1300° C. The sample was then cooled to solidify the metal. FIG. 3(b) shows a section through the resulting composites demonstrating complete infiltration of the preforms.

EXAMPLE 3

Infiltration of Al-30 wt. % Si Alloy into Particulate SiC Ceramic

Figure 4:
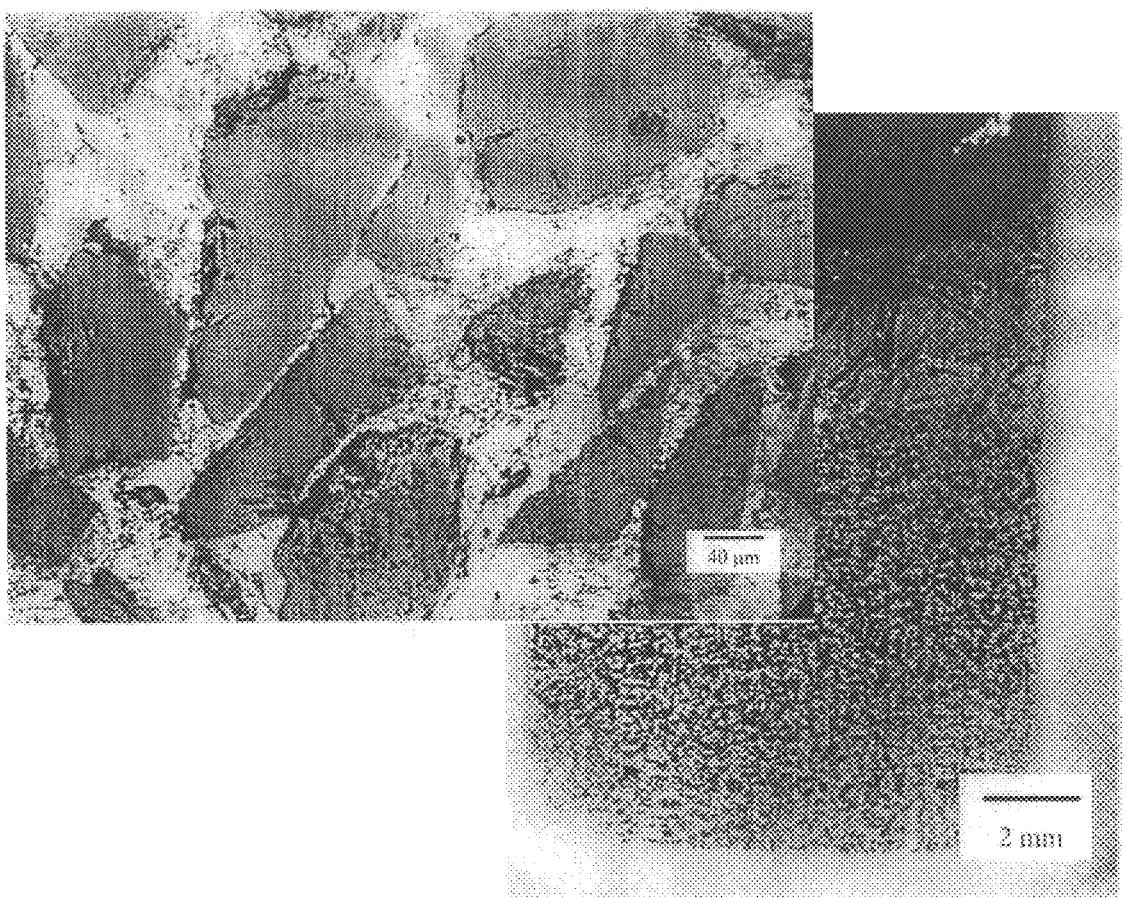
FIG. 4 shows micrographs of sections through preforms of loosely packed SiC powder that have been spontaneously infiltrated with Al—Si by heating under vacuum (approx. 1 Torr) followed by application of 1 atm argon-5% hydrogen before cooling. (a) Al—Si (30 wt. % Si) and (b) Al—Si (15 wt. % Si) infiltrant.

In a process in accordance with the present invention, SiC particulate (600 grit) was packed loosely in the bottom of each of two small alumina crucibles, (a) and (b). Alloys of Al—Si (a) 30 wt. % Si and (b) 15 wt. % Si, in quantities more than sufficient to fill the porosity in the SiC, were placed on top of the SiC in crucibles (a) and (b) respectively. The assemblages were heated at ~1000° C./h to 1250° C. and held for 15 minutes under rough vacuum of ~1 Torr. The furnace was then repressurized to 10 psig (1.7 atm absolute) with argon for 1 h and cooled at ~1000° C./h. Metallographic sectioning and polishing revealed that the SiC was completely infiltrated as shown in FIG. 4(a) 30 wt. % Si and 4(b) 15 wt. % Si. Numerous investigators have shown that Al alloys generally do not wet SiC sufficiently for spontaneous infiltration (Oh et al., Metall. Trans., 20A, 527 (1989) and Alonso et at., Metall. Trans., 24A, 1423 (1993)). However, only a small pressure that could be safely applied in a conventional vacuum furnace was necessary for complete infiltration in this experiment.

While the invention has been illustrated and described in detail in the figures and foregoing description and examples, this is to be considered illustrative and not restrictive. All modifications and equivalents of the elements of the disclosed invention that come within the spirit of the invention as defined by the following claims are contemplated and their protection is desired.

What is claimed is:

1. A process for infiltrating a porous material with a liquid composition having a contact angle with the porous material, θ, of no greater than 90 degrees, comprising the steps of:

selecting the porous material comprising a first set of pores and a pore size to particle size ratio between about 10 and about 250;

determining a critical pressure differential by evaluating a contact angle between the liquid composition and the porous material, an average particle radius of the porous material and a liquid-vapor surface tension of the liquid composition;

contacting the porous material with the liquid composition at a first pressure; and thereafter increasing the pressure by at least a predetermined critical pressure differential.

2. The process of claim 1 wherein the critical pressure differential is $\Delta P_{crit}$, which is equal to $\gamma/R^*[-1.543*(\cos(\theta))^3+3.932*(\cos(\theta))^2-4.268*(\cos(\theta))+1.876]$, wherein θ is the contact angle between the liquid composition and the porous material, R is the average particle radius of the porous material and γ is the liquid-vapor surface tension of the liquid composition.

3. The process of claim 2 wherein the porous material is a ceramic.

4. The process of claim 3 wherein the ceramic is selected from the group consisting of Zr—$B_2$, $TiB_2$, $TiO_2$, TiC, NbC, AlN, SiC, $Si_3N_4$, $SiO_2$, MgO, $MgAl_2O_4$, $Al_2O_3$, $ZrO_2$, BN, $B_4C$, WC, $MoSi_2$ and $UO_2$.

5. The process of claim 3 wherein the liquid composition is a molten metal composition.

6. The process of claim 5 wherein the metal composition is selected from the group consisting of Cu, Cu—B, Cu—O, bronze, brass, Al, Al—Cu, Al—Zn, Al—Si, Al—Mg, Ti, Ti—V—Al, Co, Fe, Ni, Zr and alloys of Co, Fe, Ni, and Zr.

7. The process of claim 5 wherein the metal composition further comprises a wetting agent.

8. The process of claim 7 wherein the wetting agent is selected from the group consisting of silicon, boron, oxygen, sulfur, carbon, titanium, zirconium, magnesium and lithium.

9. The process of claim 3 wherein the ceramic surfaces are first modified by coating with a wetting agent.

10. The process of claim 3 wherein the liquid composition is a thermoplastic or thermosetting polymer.

11. The process of claim 2 wherein the porous material is a metal composition and the liquid composition is a thermoplastic or thermosetting polymer.

12. The process of claim 2 wherein the porous material is a first metal composition and the liquid composition is a molten second metal composition and the melting point of the first metal composition is higher than the melting point of the second metal composition.

13. The process of claim 1 wherein said contacting comprises encapsulating the porous material with the liquid composition.

14. The process of claim 1 wherein the first set of pores has an average pore diameter between about 100 $\mu$m and about 500 $\mu$m.

15. The process of claim 1 wherein the porous material has an average particle size selected to be between about 2 $\mu$m and about 10 $\mu$m.

16. A process for infiltrating a porous ceramic material with a metal composition comprising the steps of:

i. selecting the porous ceramic material comprising a first set of pores and a pore size to particle size ratio between about 10 and about 250;

ii. heating the ceramic material and metal composition to a temperature greater than or equal to the melting temperature of the metal composition for a time sufficient to melt the metal composition;

iii. prior to, during or subsequent to said heating, establishing a first pressure surrounding at least the ceramic material;

iv. after said first pressure is established, contacting the ceramic material with the molten metal composition; then v. increasing the pressure by at least a predetermined critical pressure differential to a second pressure sufficient to effect substantially complete infiltration of the molten metal into the ceramic material.

17. The process of claim 16 wherein the critical pressure differential is $\Delta P_{crit}$, which is equal to $\gamma/R*[-1.543*(\cos(\theta))^3+3.932*(\cos(\theta))^2-4.268*(\cos(\theta))+1.876]$, wherein $\theta$ is the contact angle between the molten metal composition and the ceramic material, R is the average particle radius of the ceramic material and $\gamma$ is the liquid-vapor surface tension of the molten metal composition.

18. The process of claim 16 wherein said first pressure is between about $10^{-3}$ torr and about 400 torr.

19. The process of claim 18 wherein said second pressure is less than or equal to about 1 atmosphere.

20. The process of claim 16 wherein the first average pore diameter is between about 100 $\mu$m and about 500 $\mu$m.

21. The process of claim 16 wherein the porous material has an average particle size selected to be between about 1 $\mu$m and about 10 $\mu$m.

22. A process for optimizing processing conditions for infiltration of a porous matrix with a liquid composition, said process comprising:

selecting a porous matrix and liquid metal combination in which applied pressure will facilitate infiltration;

determining a critical pressure differential for the combination according to the equation:

$$\gamma/R*[-1.543*(\cos(\theta))^3+3.932*(\cos(\theta))^2-4.268*(\cos(\theta))+1.876],$$

wherein $\theta$ is the contact angle between the liquid composition and the porous material, R is the average particle radius of the porous material and $\gamma$ is the liquid-vapor surface tension of the liquid composition contacting the porous material with the liquid composition at a first pressure; and thereafter increasing the pressure by at least a predetermined critical pressure differential.

23. A process for infiltrating a liquid composition into a ceramic material comprising a plurality of pores and a pore size to particle size ratio between about 10 and about 250, said process comprising:

determining a critical pressure differential by evaluating a contact angle between the liquid composition and the porous material, an average particle radius of the porous material and a liquid-vapor surface tension of the liquid composition;

contacting said ceramic material with the liquid composition at a first pressure;

increasing the pressure on the ceramic material and liquid composition by an amount greater than or equal to the critical pressure differential to a second pressure sufficient to effect substantially complete infiltration of the porous material with the liquid composition.

24. The process of claim 23 wherein the liquid material on the surface of the porous material exhibits a contact angle less than about 90° at ambient temperature and pressure.

* * * * *